United States Patent Office 3,048,151
Patented Aug. 7, 1962

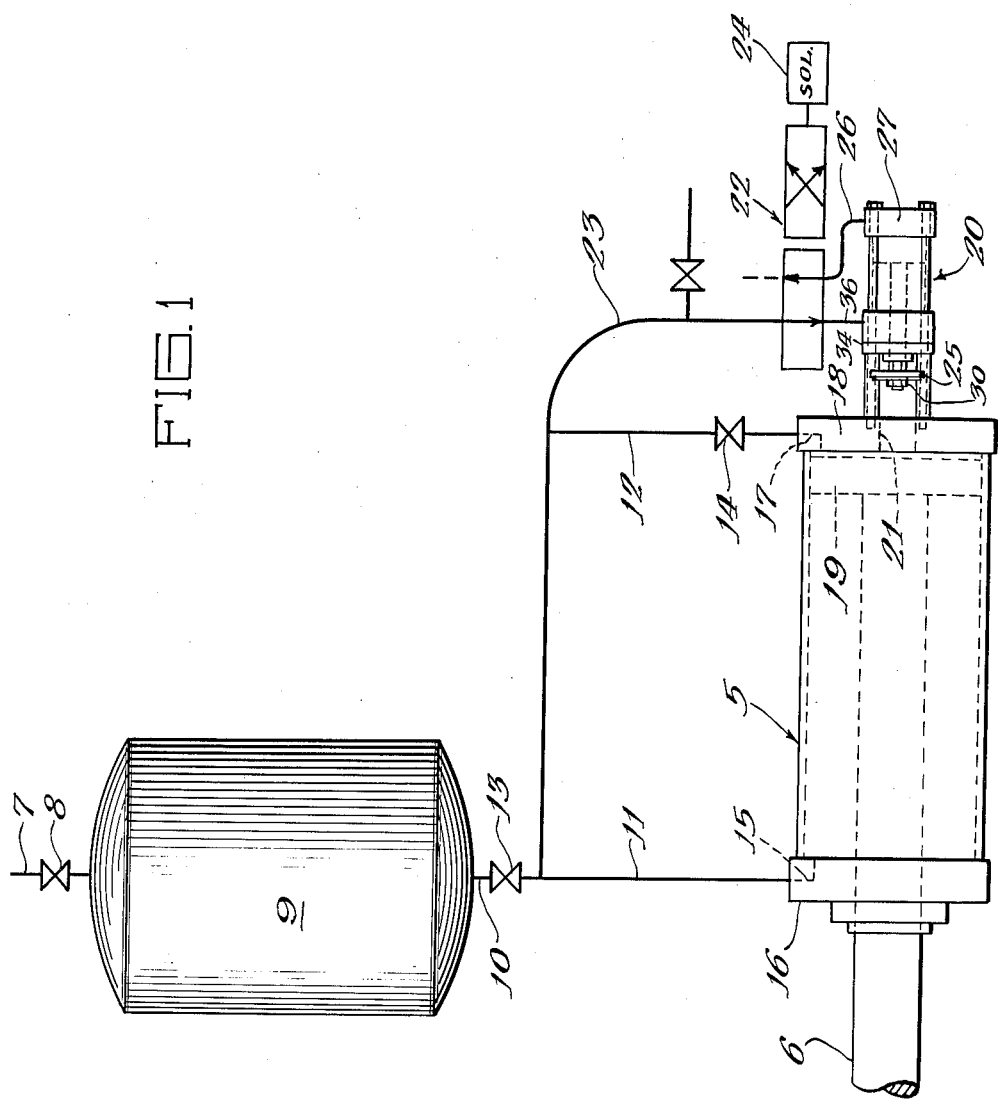

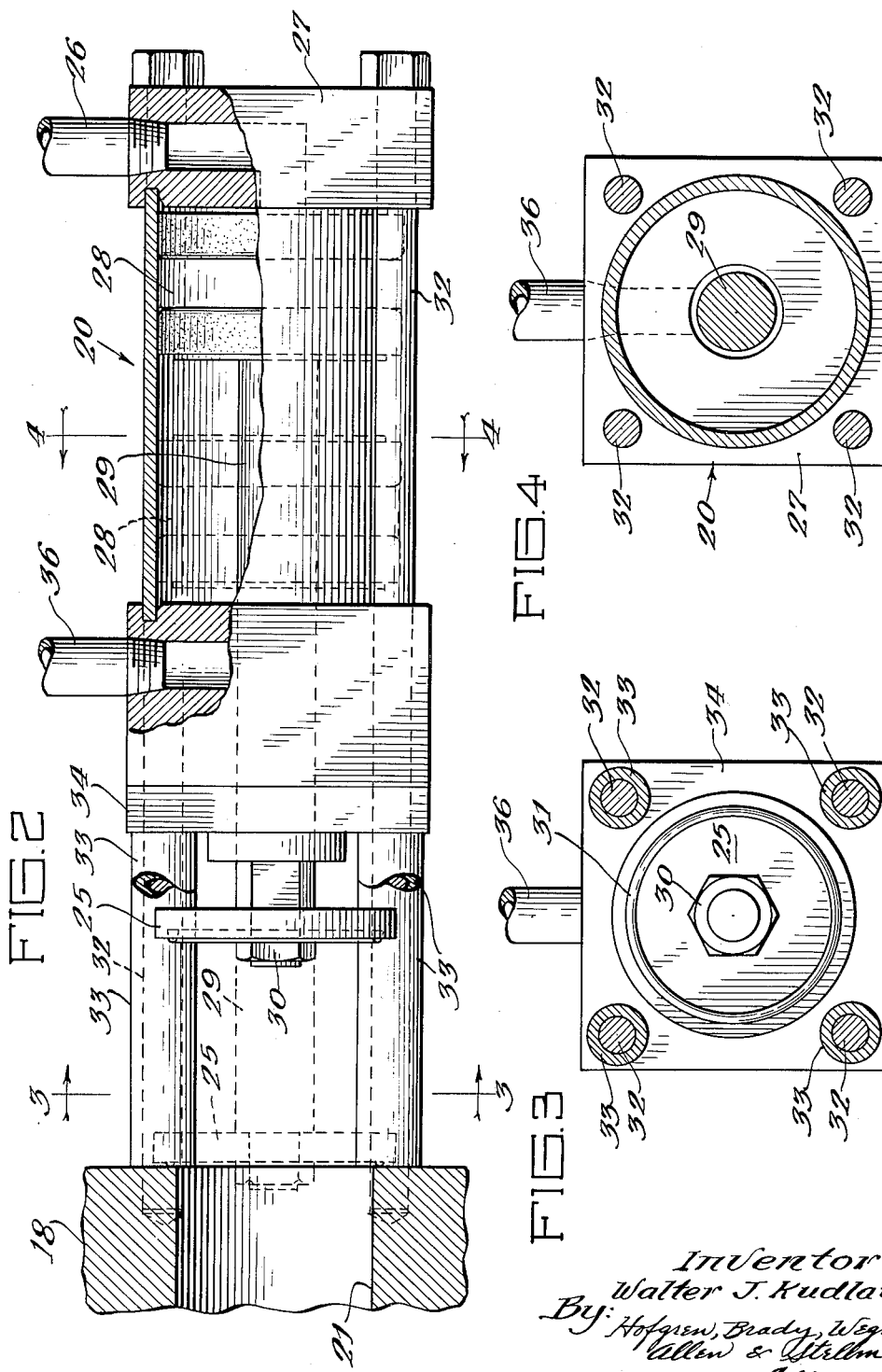

3,048,151
REMOTE CONTROL FOR A PISTON AND CYLINDER DEVICE
Walter J. Kudlaty, Elmhurst, Ill., assignor to Flick-Reedy Corporation, a corporation of Illinois
Filed May 12, 1960, Ser. No. 28,755
10 Claims. (Cl. 121—38)

This invention relates to a remote control device for a piston and cylinder device.

One application of the present cylinder structure may be in pneumatic operations wherein a piston and cylinder device may be made to operate quite rapidly. Applications in hydraulic systems may use the control as well.

Large size high pneumatic pressure controls are not readily available. Valves which have been made to handle such flow generally have high inertia due to their size as well as tortuous paths through the valves which are not conducive to high velocity and large capacity flow. Attempts to operate such valves with large solenoids have not produced rapid valve operation since the time required to energize the solenoids is too long. The present invention is particularly useful for controlling large ports through which large volume of pneumatic flow at high pressure may occur and also where speed such as at supersonic levels is required. The present invention is also quite different from available commercial controls in that the valve employs zero overlap, the valve being opened with any movement whatsoever in contrast to commercial valves.

The primary object of this invention is to provide a novel remote control for a piston and cylinder device.

Another object of the invention is to provide a control for piston and cylinder devices in which a minimum orifice length for flow of fluid is provided.

Another object is to provide such a control having the ability to avoid jet stream effect with supersonic flow of pneumatic fluids.

Another object is to provide such a control permitting flow of pneumatic fluids at supersonic rates.

A further object of the invention is to provide a novel control requiring a minimum of space and having a minimum inertia of moving parts in the control.

Other objects, features and advantages of the present invention will be apparent from the following description of a preferred embodiment of the invention illustrated in the accompanying drawings, in which:

FIGURE 1 is a diagrammatic plan view of a piston and cylinder device equipped with the novel control of this invention;

FIGURE 2 is a broken side elevational view partly in section of the control cylinder showing its connection to the piston and cylinder device of FIGURE 1;

FIGURE 3 is a sectional view through the supports for the control cylinder taken substantially along line 3—3 in FIGURE 2; and FIGURE 4 is a sectional view through the control cylinder taken substantially along line 4—4 in FIGURE 2.

The remote control described and shown herein may be used to permit flow of hydraulic fluid into a cylinder as is used in some hydraulic press work for pre-filling the cylinder; however, its primary use may concern installations requiring movement of a large cylinder within a fraction of a second of elapsed time. The latter type of installation is shown in FIGURE 1.

Referring particularly to FIGURE 1, a piston and cylinder device 5, having an extended piston rod 6 for moving a relatively large weight, is the device to be controlled. Pneumatic fluid from a supply line 7 through a valve 8 may be contained within a charge tank 9, in turn connected through line 10 and branches 11 and 12 to opposite ends of the piston and cylinder device 5. Valve 13 may be used to close the line 10 and valve 14 may close the supply to the right-hand end of the cylinder. The piston and cylinder device 5 is equipped with the usual ports herein shown diagrammatically by the dotted line 15 in the head 16 of the cylinder and the dotted line 17 in the cap 18.

The cylinder is controlled by means of a relatively small diameter piston and cylinder device 20, mounted on the cylinder 5, specifically on the cap 18, in order to control a relatively large port 21 centrally in the cap 18. A four-way valve 22 is placed in a branch line 23 leading from the charging tank 9 to the control cylinder 20. A solenoid 24 of relatively small capacity is used to control the four-way valve 22.

The operation of the structure shown in FIGURE 1 is intended to move about 500 pounds of weight in substantially less than a second of elapsed time. The arrangement is such that 250 pounds per square inch pneumatic fluid from the charging tank is introduced to both ends of the cylinder 5. Due to the differential in area on opposite sides of the piston 19 within the cylinder 5, the piston rod 6 will move to the left in FIGURE 1. At this time, the port 21 will be closed by a closure 25 under the control of the small control cylinder 20. The solenoid is energized so that control fluid may be introduced into the branch 26 leading to the cap 27 of the control cylinder. This forces the closure 25 against the cap of the cylinder 5 closing the port 21. The solenoid may be continually provided with current to hold the four-way valve to the left in FIGURE 1. An interruption of the current to the solenoid will reverse the position of the four-way valve to that shown in FIGURE 1. This action reverses the flow of pneumatic fluid in the control cylinder quite quickly as only three or four cubic inches of fluid need flow. The closure 25 is retracted to the position shown in FIGURE 1 opening the port 21 and exhausting the fluid from the cap of the cylinder 5 at supersonic flow rates. The entire action, even in moving a weight of the nature of 500 pounds, can occur in a fraction of a second.

The specific structure of the control cylinder and its relation to the large cylinder 5 is illustrated in FIGURES 2, 3 and 4. The control cylinder is provided with a seal-equipped piston 28 and a piston rod 29 carrying the closure 25. The closure is mounted upon the end of the rod by a thread seal fitting 30 and is equipped with a resilient annular sealing ring 31 intended to abut the cap 18 of the large cylinder 5 around the large port 21. The extension of the control cylinder piston and rod to the left in FIGURE 2 may bring the closure to the dotted line position closing the port 21. As shown, the port is opened and the closure retracted as shown in FIGURE 1.

The support of the control cylinder may be conveniently accomplished by the extended tie rods 32 threaded into the cap 18 around the port 21 and passing through spacing sleeves 33 which bear against the cap 18 and head 34 of the control cylinder. Such mounting provides a minimum space requirement for the control cylinder; however, it should be understood that a separate mounting for the control cylinder could be equally effective.

The flow of control fluid into the head 34 of the control cylinder is through a line 36 and when the closure 25 is to be retracted, fluid is introduced into the head of the control cylinder.

The particular example of supersonic flow mentioned may best occur under certain control conditions. It has been found that jet effect of air flow is avoided in the present structure. In the present instance the closure 25, when retracted a particular distance, aids in producing faster exhausting of the large cylinder 5. For a given diameter of port 21, it has been found that the retracted distance between the closure 25 and the face of the cap 18 should be no less than half of the diameter of the port 21 and no more than equal to the diameter. With such spacing the exhaust fluid impinges upon the closure and turns radially outwardly without restricting the flow through the port 21.

In addition to the formula noted above relative to supersonic flow, it has been found that the available area beyond the port 21 should be equal to or greater than the port area and preferably should increase in size with an increase in distance from the port. Referring to FIGURE 3, it has been found that the sum of the distances between the spacers 33 about the tie rods 32 should be greater than the circumference of the port 21. Under such conditions no restrictions in the flow occurs. Flow rates at about mach 3 have been found to be preferable and to provide a minimum operating time for the piston and cylinder device 5.

The control may be made with available small bore cylinders and the alignment with the port 21 may be visually checked for accuracy. A minimum of moving parts are required and the closure 25 and port 21 do not require special machining or preparation for proper operation.

The foregoing detailed description has been given for clearness of understanding only and no unnecessary limitations should be understood therefrom, for some modifications will be obvious to those skilled in the art.

I claim:

1. A control for exhausting a pneumatic cylinder at supersonic flow rates, comprising in combination: a pneumatic cylinder having a cap at one end provided with a realtively large port axially aligned with the cylinder; a relatively small control piston and cylinder device having a piston rod extending toward said pneumatic cylinder cap; a closure on said control cylinder piston rod realingly engaging said cap to close said large port and retractable from said sealing engagement with the cap; a source of pneumatic fluid for charging said pneumatic cylinder to a predetermined position; means for charging said control cylinder to hold said closure against the cap of said pneumatic cylinder to close said port; and electrical control means for reversing the charge in said control cylinder to move said closure rapidly away from the pneumatic cylinder cap to allow discharge of the pneumatic fluid therein through said port at a supersonic flow rate.

2. A control as specified in claim 1 wherein said closure has a periphery and is moved away from said pneumatic cylinder cap axially of said pneumatic cylinder a distance to provide a flow area between said cap and the periphery of said closure at least as great as the flow area through the port in said pneumatic cylinder cap.

3. A control as specified in claim 1 wherein the port in said pneumatic cylinder cap is round and said closure is moved away from said cap a minimum distance of one-half of the diameter of said port and a maximum distance equal to the diameter of said port.

4. A control as specified in claim 1 wherein said control cylinder is provided with tie rods extended about said closure and secured to said pneumatic cylinder to mount said control cylinder to said pneumatic cylinder, and said closure is moved away from said port a distance to provide a flow area between the cap and closure and between said tie rods greater than the flow area of said large port.

5. A control for exhausting a pneumatic cylinder at supersonic flow rates to provide quick movement of a large weight, comprising in combination: a pneumatic piston and cylinder device adapted to be completely charged with pneumatic fluid at superatmospheric pressure; means for exhausting one end of the cylinder device to provide for rapid movement of the piston under influence of the charged pneumatic fluid including a relatively large port in said cylinder at said one end, a relatively small control cylinder having a closure for said port, means for charging said control cylinder to maintain said closure in position closing said port when the pneumatic piston and cylinder device is completely charged, and electrical means for reversing the charge in said control cylinder to instantaneously retract said closure from said position remote therefrom permitting supersonic flow of pneumatic fluid from said one end of said piston and cylinder device, said control cylinder being of a capacity to permit said reversing of said charge within a fractional second of elapsed time.

6. A control as specified in claim 5 wherein the port in said piston and cylinder device is aligned axially of the cylinder of said device and said closure is movable axially toward and away from said port whereby fluid exhausting from the piston and cylinder device exits the port axially of the cylinder against the retracted closure and then turns radially outwardly of the cylinder.

7. A control as specified in claim 5 wherein the piston and cylinder device has a cap at one end and said port extends axially of the cylinder through the cap, said closure is mounted to move axially of said cylinder and engages said cap about the port so that initial movement of the closure away from the cap opens the port immediately and continued movement increases a radial opening between said cap and closure for supersonic flow without restriction.

8. A control as specified in claim 7 wherein said control cylinder moves said closure from said cap a distance to provide a radial flow passage between the cap and closure at least as great as the flow area through said port within a fractional part of a second elapsed time.

9. A control as specified in claim 5 wherein the piston and cylinder device has a flat cap at one end with a central large port therethrough axially of the cylinder said closure is movable axially of the cylinder to cover said port in face to face engagement with the cap around said central large port whereby initial movement of the closure away from said cap opens the central large port immediately.

10. A control for a piston and cylinder device for providing unrestricted flow of motive fluid relative to the interior of the cylinder, comprising in combination: a cap on the piston and cylinder device having an axially arranged relative large port therethrough communicating the interior of the cylinder with the exterior thereof; a control cylinder mounted in tandem with the piston and cylinder device opposite said cap and generally axially in alignment with said cylinder and said large port; a control piston rod in said control cylinder movable toward and away from the large port; a closure carried by said control piston rod and having a portion for extending across said large port to engage the cap about the port to close the port against flow of motive fluid through the port; control means for energizing the control cylinder into opposite positions opening and closing said large port and means for admitting motive fluid to the control cylinder to maintain said closure in closed position over said port when the piston and cylinder device is charged with motive fluid.

References Cited in the file of this patent
UNITED STATES PATENTS

| | | |
|---|---|---|
| 1,051,768 | Rumold | Jan. 28, 1913 |
| 2,610,613 | Bryant | Sept. 16, 1952 |
| 2,680,304 | Herbert | June 8, 1954 |
| 2,925,803 | Ottestad | Feb. 23, 1960 |
| 2,986,120 | Murek | May 30, 1961 |